(12) United States Patent
Gehring (10) Patent No.: US 7,215,036 B1
(45) Date of Patent: May 8, 2007

(54) CURRENT POWER GENERATOR

(76) Inventor: Donald Hollis Gehring, 14690 Old Conroe Rd., Conroe, TX (US) 77384

( * ) Notice: Subject to any disclaimer, the term of this patent is extended or adjusted under 35 U.S.C. 154(b) by 0 days.

(21) Appl. No.: 11/132,489

(22) Filed: May 19, 2005

(51) Int. Cl.
*F03B 13/10* (2006.01)

(52) U.S. Cl. .................................................. 290/54

(58) Field of Classification Search ............... 290/43, 290/44, 54, 55
See application file for complete search history.

(56) References Cited

U.S. PATENT DOCUMENTS

| | | | | |
|---|---|---|---|---|
| 2,501,696 | A * | 3/1950 | Souczek ...................... | 290/43 |
| 4,265,568 | A * | 5/1981 | Herrmann et al. .......... | 405/196 |
| 4,520,273 | A | 5/1985 | Rowe | |
| 4,613,279 | A * | 9/1986 | Corren et al. ............. | 415/121.2 |
| 4,717,831 | A | 1/1988 | Kikuchi | |
| 5,440,176 | A * | 8/1995 | Haining ....................... | 290/54 |
| 5,506,453 | A * | 4/1996 | McCombs ................... | 290/44 |
| 5,512,287 | A * | 4/1996 | Wang et al. ................ | 424/750 |
| 5,642,984 | A * | 7/1997 | Gorlov ........................ | 416/176 |
| 5,882,143 | A * | 3/1999 | Williams, Jr. .............. | 405/78 |
| 6,531,788 | B2 * | 3/2003 | Robson ....................... | 290/43 |
| 6,766,643 | B2 * | 7/2004 | Christensen ................ | 60/398 |
| 6,856,036 | B2 * | 2/2005 | Belinsky ...................... | 290/42 |
| 6,975,045 | B2 * | 12/2005 | Kurachi et al. ............. | 290/44 |
| 2003/0137150 | A1 * | 7/2003 | Shu ............................. | 290/54 |
| 2004/0061338 | A1 | 4/2004 | Woodbridge | |
| 2004/0103658 | A1 | 6/2004 | Laveria | |
| 2005/0134050 | A1 * | 6/2005 | Salls ........................... | 290/54 |
| 2005/0236841 | A1 * | 10/2005 | Henriksen .................... | 290/54 |
| 2005/0248162 | A1 * | 11/2005 | Krouse ........................ | 290/54 |

FOREIGN PATENT DOCUMENTS

| | | |
|---|---|---|
| CA | 2160756 | 4/1996 |
| DE | 20008482 U1 * | 9/2000 |
| GB | 2347976 A * | 9/2000 |
| GB | 2351124 A * | 12/2000 |
| GB | 2383978 A * | 7/2003 |
| WO | WO 03/025385 A2 * | 3/2003 |

* cited by examiner

*Primary Examiner*—Joseph Waks
(74) *Attorney, Agent, or Firm*—Bracewell & Giuliani LLP (57) ABSTRACT

A current power generator includes a vertical support member mounted to the seabed and horizontal support members mounted to the vertical support member. Generators are mounted between the horizontal support members. A rotatable shaft is operatively connected to each of the generators such that when the shaft rotates, the generator generates electricity. Blades mounted to the shaft are capable of rotation in response to water current. The generators are pivotal relative to the horizontal support members in response to changing current flow direction.

15 Claims, 9 Drawing Sheets

CURRENT POWER GENERATOR

FIELD OF THE INVENTION

The present invention relates to alternative energy generation sources, and in particular to a current power generator.

BACKGROUND OF THE INVENTION

As the demand for energy increases in both the developed and developing world, mankind turns to new and alternative sources of generating power. For example, geothermal, wind, solar, and hydroelectric sources are widely explored to help assuage the ever increasing demand for energy. To address this need, a variety of energy generating devices have been introduced.

U.S. Pat. No. 6,531,788 discloses a submersible generating plant for producing electricity from ocean currents. The apparatus consists of two counter-rotating, rear-facing turbines with a plurality of rotor blades extending radially outward from two separate horizontal axis that convey the kinetic energy from the two side-by-side turbine rotors through separate gearboxes to separate generators that are housed in two watertight nacelles that are located sufficiently far apart to provide clearance for the turbine rotors. The two generators and their gearboxes serve as ballast and are located below a streamlined buoyancy tank that extends fore and aft above and between them. A leverage system having no moving parts adjusts lifting forces to balance changing downward vector forces that result from changes in drag acting on the downward angled anchor line.

U.S. Pat. No. 4,717,831 discloses an ocean and river water power generator having a plurality of water wheel power generators. Said water wheel power generator includes a common concrete base, a water wheel having a main shaft thereof and a plurality of water wheel impellers fixedly and radially attached to said main shaft for transforming potential energy of water in the ocean or a river to rotational energy thereof, a speed-up gear means having an input shaft thereof connected with one end of said main shaft for increasing the number of RPM of the main shaft for increasing said rotational energy.

U.S. Pat. No. 4,551,066 discloses a water wheel for operating fully submerged in an ocean current has a rotating frame member supported on the ocean floor for rotation about a vertical axis. The frame member supports a plurality of vertically extending vanes, each vane being rotatably supported on the frame for limited rotation about a vertical axis. It has a hydrofoil shape in cross-section with the axis of rotation parallel to the leading and trailing edges. Rotation of the vanes is limited relative to the frame by a hydraulic piston control system and shock absorbers.

U.S. Pat. No. 4,520,273 discloses a rotor generator including an elongated generally cylindrically shaped mework. An elongated rotor is longitudinally aligned within the framework and is rotatably mounted therein. The rotor has a plurality of curved blades which are capable of causing rotation of the rotor when there is fluid flow, such as water or air current. The rotor has a magnetic characteristic which may be provided by attaching magnets to the rotor blades or magnetizing the blades themselves. A plurality of wires are mounted on the framework about the rotor so that when the rotor is rotated electrical current is induced in the wires. Apparatus is provided for collecting the induced electrical current so that the electrical current can be provided for power purposes, such as charging a battery. With this arrangement the rotor generator can be placed on the bottom of the ocean where there is current flow, and utilized for charging a battery which may in turn power oceanographic equipment.

U.S. Patent Application No. 20040061338 is directed towards a reciprocating generator rigidly attached to the underside of an ocean buoy and creates electric power from the surface ocean swells. The generator coil maintains a stable position beneath the ocean surface while the magnetic field housing reciprocates with the vertical motion of the buoy in response to interaction with swell and waves on the surface of the ocean. Damping plates attached to the generator coil inhibit the motion of the generator coil, thus keeping it in a stable position relative to the motion of the magnetic housing. The magnetic housing focuses the magnetic field through the generator coil and the relative motion between the magnetic housing and generator coil creates an electromotive force in the coil. The design of the generator provides a uniform field of single magnetic orientation throughout the entire stroke of the generator. Permanent magnets and electromagnet windings create and enhance the magnetic field of the reciprocating generator.

Canada Patent No. 2,160,756 is directed towards an Ocean Current Power Generator. The abstract for this document was not provided by the issuing authority at the time it was entered into the ICO patent database. Also the image (PDF) file was not available for this document.

U.S. Patent Application No. 20040103658 is directed towards a system for conversion of wave energy in a body of a fluid using electromagnetic coupling (by moving a magnetic device inside a coil, or a coil inside magnetic field) driven by the linear motion due to either a buoy on a liquid or a linear movement induced by any mechanical means driven by a fluid, including: (a) a stationary support element mounted to the floor or to the floor of the body of the fluid in the form of a magnet or a coil; (b) a moving or buoyancy apparatus, for liquid fluids, including a buoy portion having formed therewith wave energy collection apparatus in the form of a floating device containing a magnet, or a coil; (c) coupling apparatus for connecting the moving or buoyancy apparatus to the stationary support element so as to be pivotal in a generally vertical plane with respect to the stationary support element; (d) at least a set a cables to allow for the flow of the electric current to a control/regulator/storage device, correspondingly, the piston apparatus being guided by a stationary support, in association with a predetermined element operative to move in response to movement of the moving or buoyancy apparatus, or running fluid such as air or running water.

There is a need, however, for an ocean current power generator that can align itself with the ocean current by having the ability to rotate 360 degrees and to pivot in a plurality of directions. None of the above identified devices disclose such a device. It would therefore be beneficial if a current power generator existed that could be utilized to convert the energy of ocean waves into electrical energy for consumption.

SUMMARY OF THE INVENTION

It is an aspect of the present invention to provide a current power generator that can generate energy from ocean currents.

It is a further aspect of the present invention to provide a current power generator to generate energy from ocean currents that is mounted to a support frame on the seabed.

It is yet a further aspect of the present invention to provide a current power generator that has additional alternative sources of energy generation.

In accordance with a first aspect of the present invention, a novel current power generator is provided. The novel current power generator includes a support frame; a generator mounted to the support frame; a rotatable shaft, operatively connected to the generator such that when the shaft rotates, the generator generates electricity; a plurality of blades mounted to the shaft, capable of rotation in response to water current; and a power cable, in electrical communication with the generator.

In accordance with another aspect of the present invention, a novel current power generator is provided. The novel current power generator includes a floating support frame; a generator mounted to the floating support frame; a rotatable shaft, operatively connected to the generator such that when the shaft rotates, the generator generates electricity; a plurality of blades mounted to the shaft, capable of rotation in response to water current; a mooring anchor, mounted to the seabed; a mooring line, having a first and second end, wherein the first end of the mooring line is attached to the floating support frame and the second end of the mooring line is attached to the mooring anchor; and a power cable, in electrical communication with the generator.

In accordance with yet another aspect of the present invention, a novel current power generator including alternative energy generating sources is provided. The novel current power generator includes a support frame, comprising vertical frame members having a first end mounted in the seabed, and proceeding upward therefrom to a second end, and horizontal frame members mounted generally centrally along the vertical frame members; a plurality of generators mounted to the horizontal support members; a rotatable shaft, operatively connected to each generator such that when the shaft rotates, the generator generates electricity; a plurality of blades mounted to the shaft, capable of rotation in response to water current; a plurality of wave generators mounted to the top of the horizontal frame members; a surface platform mounted at the second end of the vertical support members; an alternative energy generator mounted upon the surface platform; and a power cable, in electrical communication with the generators, the alternative energy generator, and the wave generators.

BRIEF DESCRIPTION OF THE DRAWINGS

The foregoing summary, as well as the following detailed description of a preferred embodiment of the present invention will be better understood when read with reference to the appended drawings, wherein.

DETAILED DESCRIPTION OF THE PREFERRED EMBODIMENT

Figure 1:
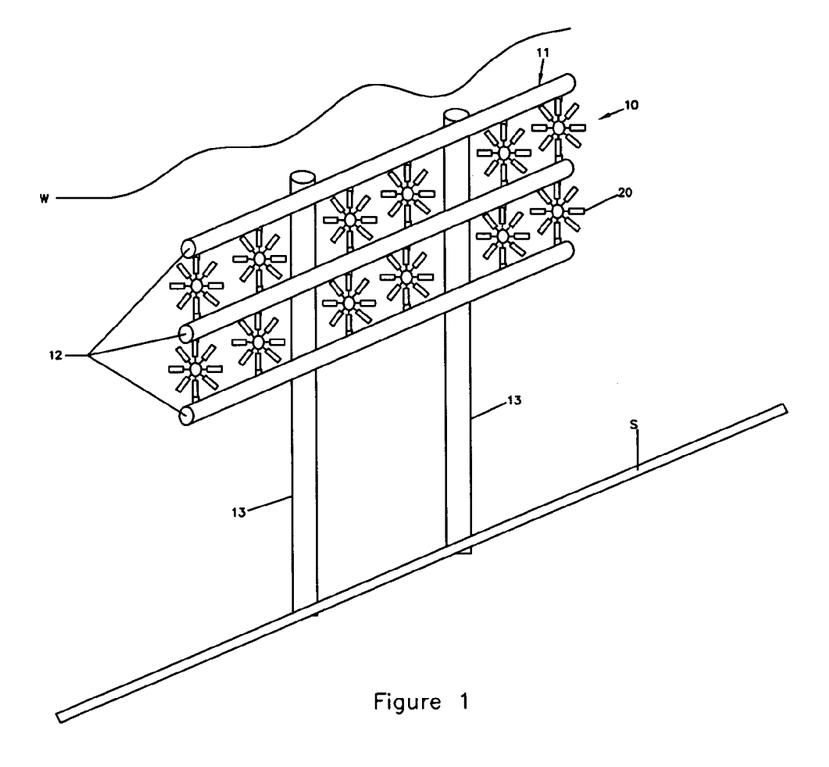
FIG. 1 is a perspective view of a current wave generator in accordance with the present invention.
Figure 2A:
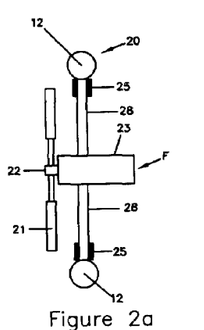
FIG. 2a is a right side elevation of a current wave generator in accordance with the present invention.
Figure 2B:
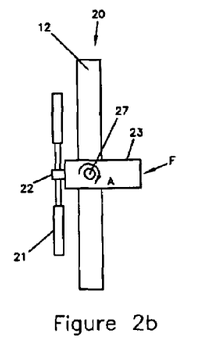
FIGS. 2b–2f are top plan views of a current wave generator shown in various configurations responding to current flow.
Figure 2C:
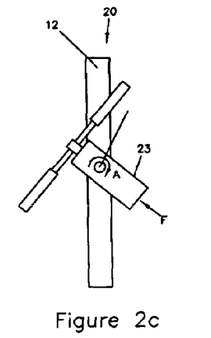
Figure 2D:
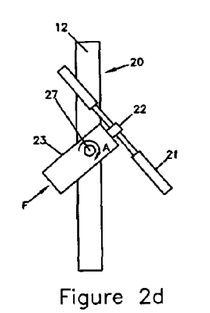
Figure 2E:
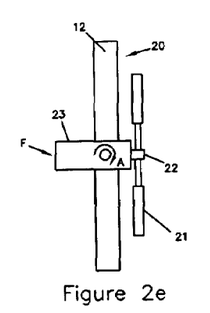
Figure 2F:
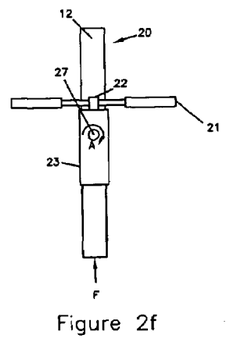

Referring now to the drawings, wherein like reference numerals refer to the same components across the several views and in particular to FIG. 1, a current power generator 10 is shown. The current power generator 10 includes a support frame 11 and a plurality of current generators 20.

The support frame 11 includes horizontal support members 12 and vertical support members 13. The vertical support members 13 are mounted at a first end to the seabed S and extend generally upward from the seabed S to a second end. Mounted proximate to the second end of the vertical support members 13 are the horizontal support members 12. In a preferred embodiment of the present invention, the horizontal support members 12 are mounted generally perpendicularly to the vertical support members 13, however, the horizontal support members 12 may be attached in any way known to one of ordinary skill in the art. In a preferred embodiment, the support frame 10 is beneath the surface line W.

Referring now to FIGS. 2a–2f, the current generator 20 will now be described. The current generator 20 includes a plurality of blades 21 mounted to a shaft 22. A generator 23 is disposed upon the shaft for generating electricity when the shaft 22 rotates. An extension shaft 28 is mounted to the generator 23 and proceeds generally perpendicularly outward therethrough The extension shaft 28 is attached to the horizontal support frame 12. Disposed on the extension shaft 28 proximate the horizontal support frame 12 are electrical contactors 25. The electrical contactors 25 are electrically connected to the power cables 60 to transfer the electricity generated by the generators 23 to a power grid (not shown). The generator 23 is pivotally mounted to the extension shaft 28 so as to allow the generator 23 to pivot about its axis in the direction of the arc A, or in the opposite direction to arc A. In a preferred embodiment of the present invention, the plurality of blades 21 respond to current flow F in order to align with the current flow F, similar to a weathervane. As the plurality of blades 21 weathervane to align with the current flow F, the shaft 22 causes the generator 23 to pivot about its axis. Furthermore, the current flow F causes the plurality of blades 21 to rotate the shaft 22, which in turn operates the generator 23 to generate electricity.

Figure 3:
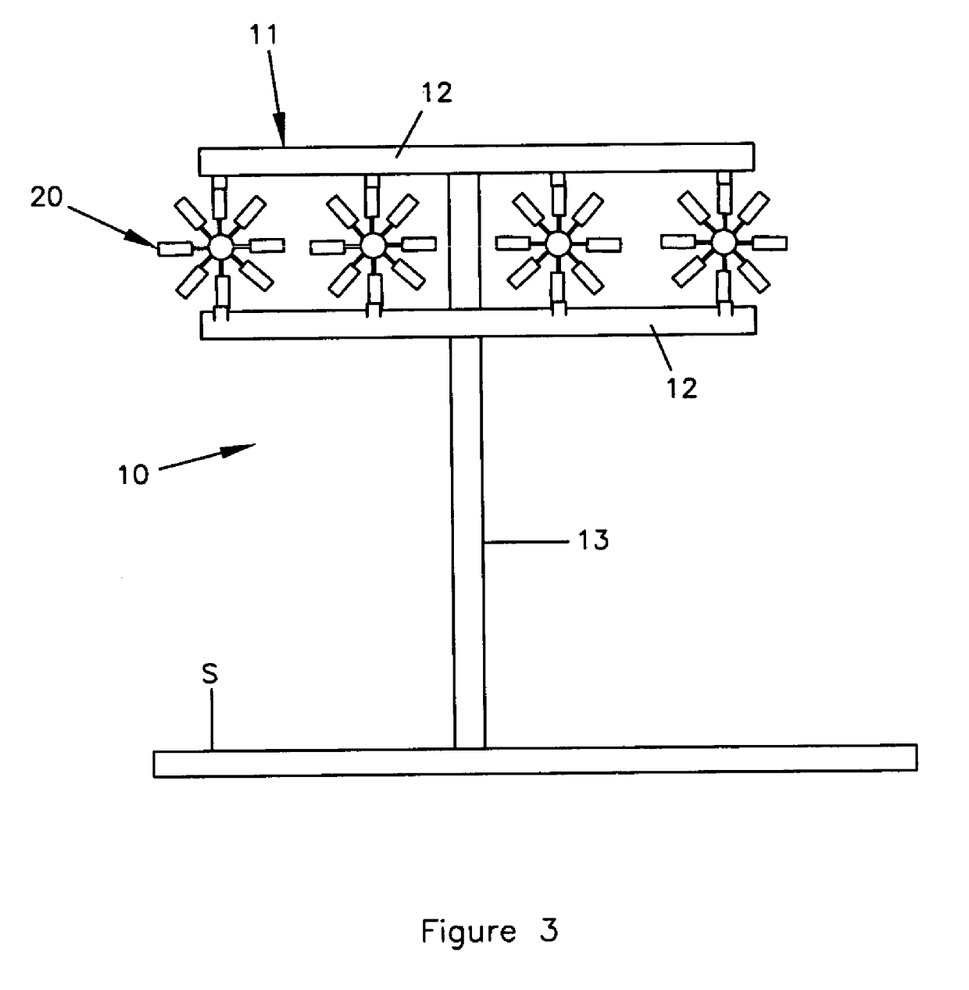
FIG. 3 is a front elevation view of a current wave generator in accordance with the present invention.
Figure 4A:
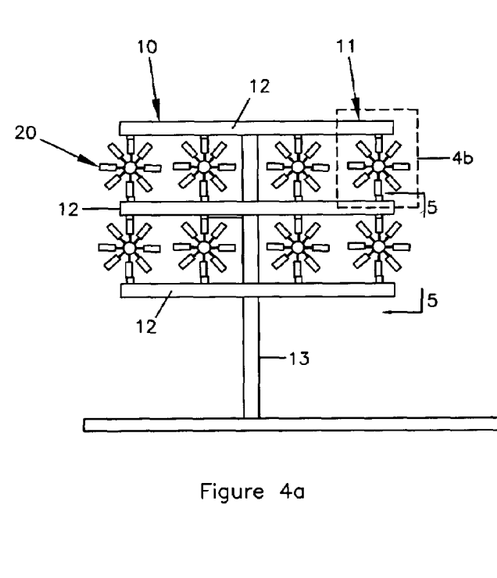
FIG. 4a is a front elevation view of a current wave generator having two rows.
Figure 4B:
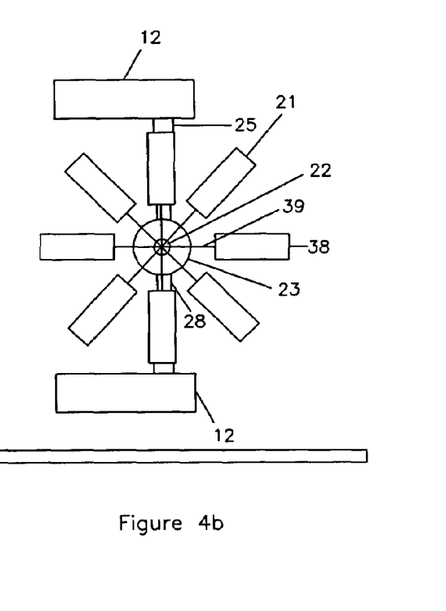
FIG. 4b is an expanded detail view of a current generator as depicted in FIG. 4a FIG. 5 is a partial side elevation of the current generator of FIG. 4a along the lines 5—5.
Figure 5:
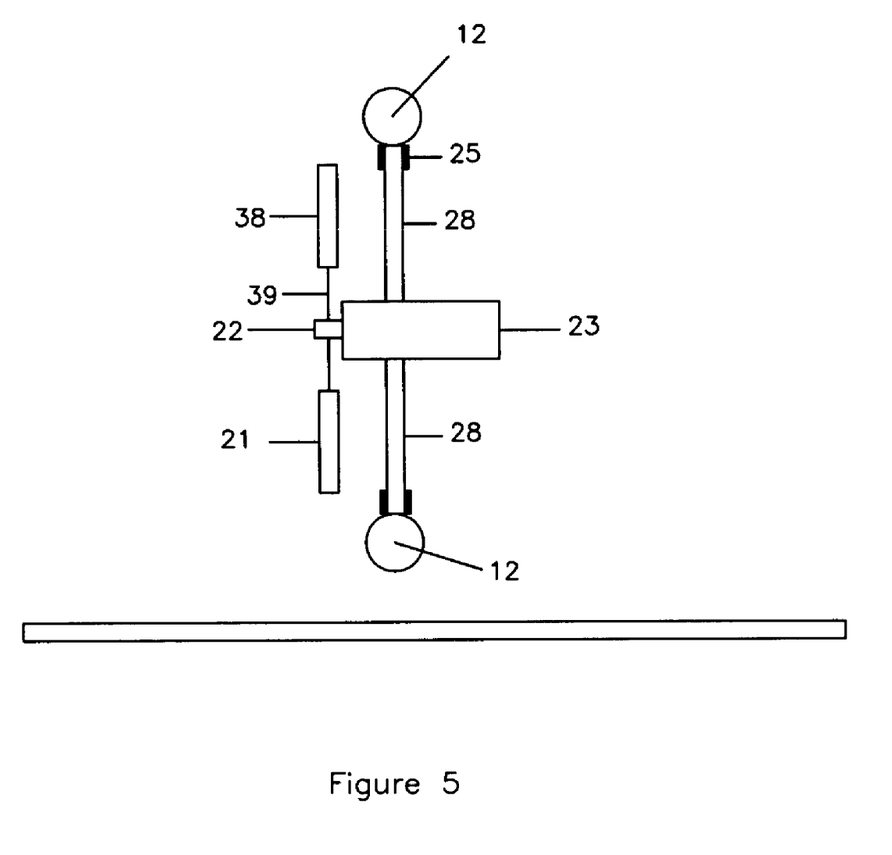

As shown in FIG. 3, the support frame 11 can include only one vertical support member 13 and two horizontal support members 12. Referring now to FIGS. 4a, 4b, and 5, the current power generator 10 can be seen in more detail. The plurality of blades 21 comprise a wide portion 38 and a narrow portion 39. The narrow portion 39 is mounted to the shaft 22 and proceeds perpendicularly outward therefrom.

The wide portion 38 is mounted at the distal end of the narrow portion 39 and responds to the ocean currents.

Figure 6:
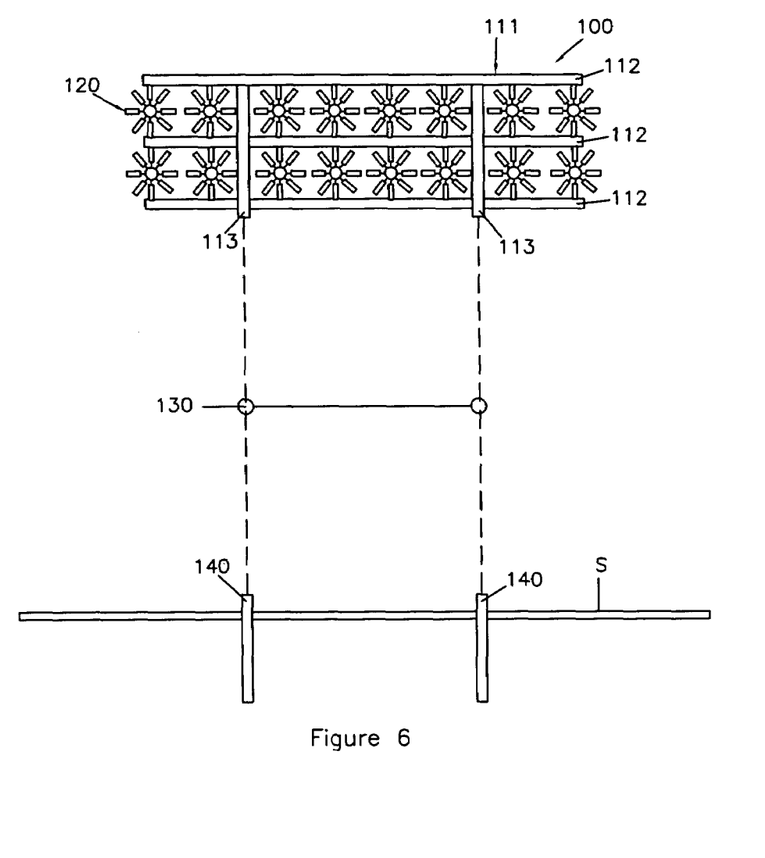
FIG. 6 is an alternative embodiment of a floating current generator in accordance with the present invention.

Referring now to FIG. 6, an alternative embodiment of a current power generator 100 is depicted. The current power generator 100 includes a floating support frame 111 and a plurality of current generators 120 mounted to the floating support frame 111. The current generators 120 are substantially structurally similar to, and operate substantially similarly to the current generators 20. The floating support frame 111 includes vertical support members 113 and horizontal support members 112. In a preferred embodiment of the present invention, the horizontal support members 112 are mounted generally perpendicularly to the vertical support members 113, however, the horizontal support members 112 may be attached in any way known to one of ordinary skill in the art. A mooring line 130 is attached to the bottom of the vertical support member 113 at one end and to a mooring anchor 140 at the other end of the mooring line 130. In this fashion, the floating support frame 111 is anchored to the seabed S via the mooring line 130. In a preferred embodiment of the present invention, a mooring line 130 is attached to the bottom of each vertical support member 113 as depicted in FIG. 6, however, any number of mooring lines 130 known to one of ordinary skill in the art may be used. Power cables (not shown) may be attached to the current power generator 100 using any means known to one of ordinary skill in the art.

Figure 7A:
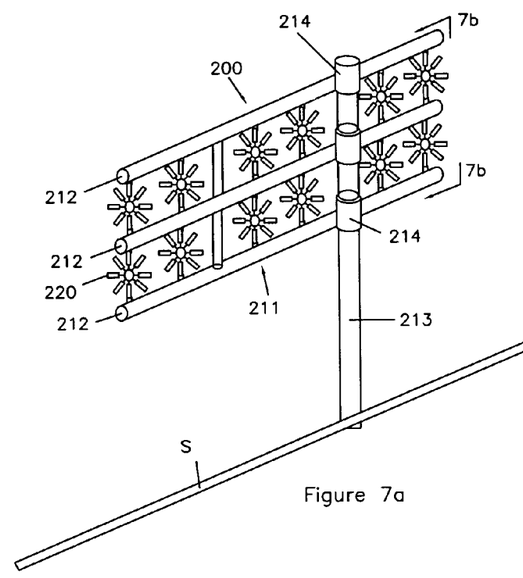
FIG. 7a is a perspective view of a weathervaning current generator in accordance with the present invention.
Figure 7B:
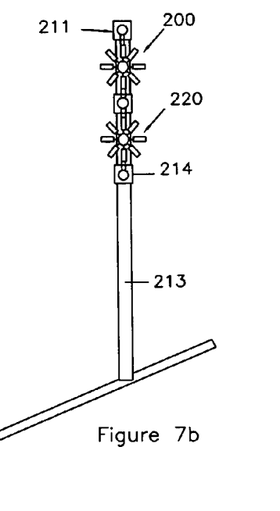
FIG. 7b is a side elevation view of the weathervaning current generator of FIG. 7a along the lines 7b—7b.

Referring now to FIGS. 7a and 7b, an alternative embodiment of a current power generator 200 is depicted. The current power generator 200 includes a support frame 211, which is comprised of a vertical support member 213, horizontal support members 212, and collars 214. The collar 214 is rotatably attached to the vertical support member 213, and the horizontal support members 212 are fixedly attached to the collars 214, such that the horizontal support members 212 can pivot about the axis of the vertical support member 213 at the collars 214 in response to water current flow. Current generators 220 are mounted to the horizontal support members 212 for generating electricity. The current generators 220 are substantially structurally similar to, and operate substantially similarly to the current generators 20. Power cables (not shown) can be electrically connected to the current generators 220 to transfer the electrical energy from the current generators 220 for consumption, for example, via a power grid (not shown).

Figure 8:
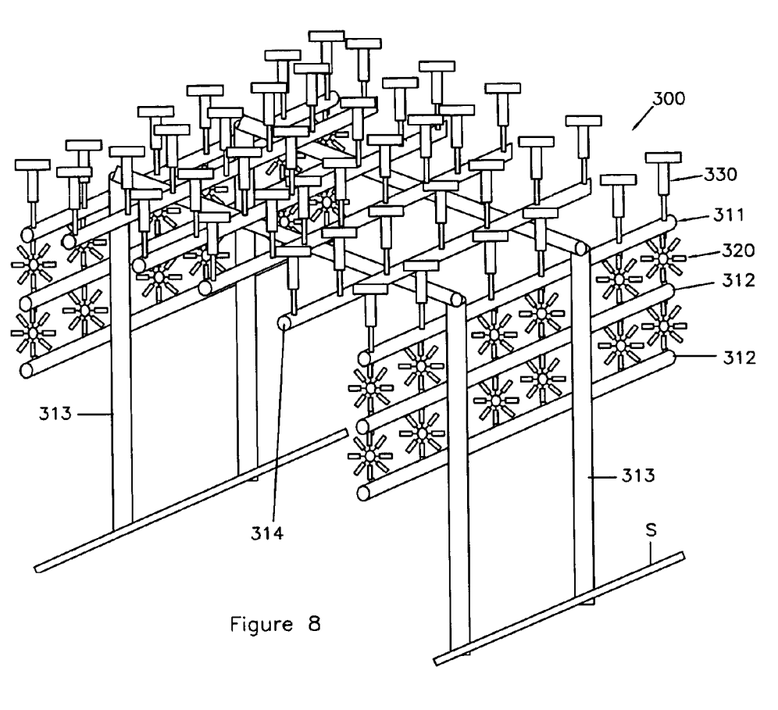
FIG. 8 is a perspective view of an alternative embodiment of a current generator with wave generators.

Referring now to FIG. 8, an alternative embodiment of a current power generator 300 is shown. The current power generator 300 includes a support frame 311, which is comprised of vertical support members 313 mounted to the seabed S, and horizontal support members 312. In a preferred embodiment of the present invention, the horizontal support members 312 are mounted generally perpendicularly to the vertical support members 313, however, the horizontal support members 312 may be attached in any way known to one of ordinary skill in the art. Current generators 320 are mounted to the horizontal support members 312 to generate electricity from water current. The current generators 320 are substantially structurally similar to, and operate substantially similarly to the current generators 20. Wave generators 330 can be mounted on the top of the topmost horizontal support members 312. The wave generators 330 include a floating buoy which generates electricity as an ocean wave rises and falls. Power cables (not shown) can be electrically connected to the current generators 320, and to the wave generators 330 to transfer the electrical energy from the current generators 320 and the wave generators 330 for consumption, for example, via a power grid (not shown).

In a preferred embodiment of the present invention, the wave generators 330 generate electricity independent of the current generators 320, however, the wave generators 330 can be operatively connected to the current generators 320.

Figure 9A:
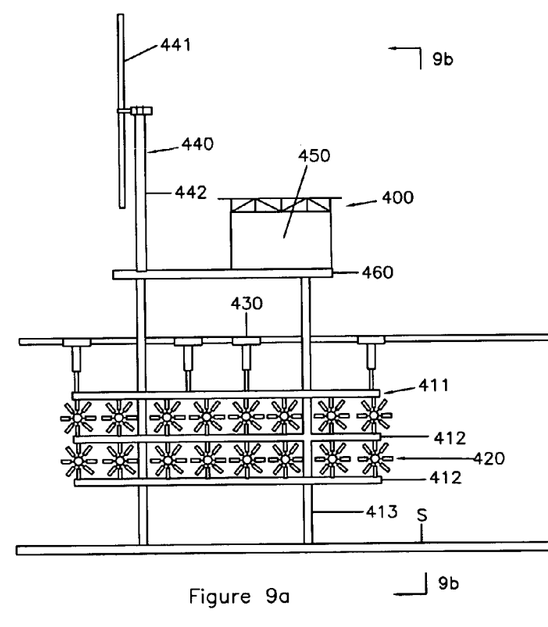
FIG. 9a is a front elevation view of an alternative embodiment of current generator having a surface portion and submerged portion, in accordance with the present invention.
Figure 9B:
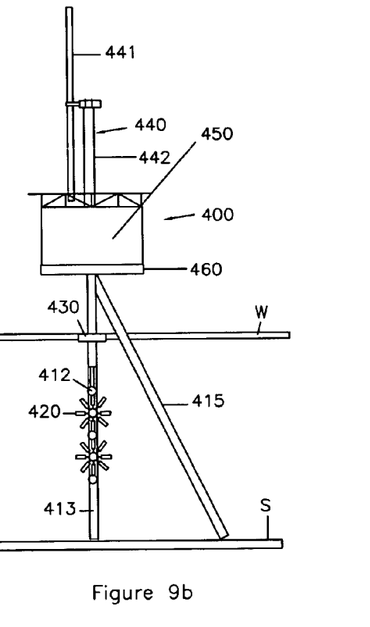
FIG. 9b is a right side elevation view of the current generator of FIG. 9a along the lines 9b—9b.

Referring now to FIGS. 9a and 9b, another alternative embodiment of a current power generator 400 is depicted. The current power generator 400 includes a support frame 411 having vertical support members 413 mounted to the seabed S and proceeding upward therefrom through the surface of the water, and horizontal support members 412 mounted to the vertical support members 413. Current generators 420 are mounted to the horizontal support members 412 to generate electricity in response to water current flow. The current generators 420 operate in substantially the same fashion as the current generators 20. Wave generators 430 are mounted to the topmost horizontal support members 412 and are substantially structurally similar to, and operate substantially similarly to the wave generators 330.

Mounted above the surface of the water on the vertical support members 413 is a surface platform 460. An alternative energy generator 440 is mounted on the surface platform 440 to alternatively generate electricity. In a preferred embodiment of the present invention, the alternative energy generator 440 is a wind powered generator and includes a windmill 441 connected to a shaft 442, which turns a generator (not shown) when the windmill 441 turns in response to air current flow. A control house 450 is located on the surface platform and can house a control room, switch gear, transformers, accommodations, and heliport. A support brace 415 can provide additional stability to the surface platform 460. The support brace 415 is mounted to the seabed S at one end and proceeds angularly upward to an attachment point on the surface platform 460. Power cables (not shown) can be electrically connected to any combination of the current generators 420, the wave generators 430, or the alternative energy generator 440. For example, the current generators 420, wave generators 430, and the alternative energy generator 440 can generate power independently of one another or in any combination with one another to be transferred via the power cables for consumption.

In a preferred embodiment of the present invention, a typical wave generator includes a buoy, an anchor cable, a generator, and a pulley The buoy floats on the surface of the ocean and rises and falls as the waves rise and fall. The anchor cable is connected to the underside of the buoy at a first end. A second end is connected to the pulley, which is mounted on the generator.

The generator includes an outer case and an inner chamber. The inner chamber of the generator houses a rotor which turns to generate electricity. The rotor is connected to a shaft. Disposed at one end of the shaft is the pulley. The second end of the anchor cable is wrapped around the pulley. As the buoy rises and falls, the anchor cable rotates the pulley, and the shaft, which in turn rotates the rotor within a stator, thereby generating electricity.

The operation of the pulley is more fully described as follows. The pulley is mounted on the shaft such that when the pulley rotates in a first direction, the pulley rotates the shaft, and thereby rotates the rotor. When the pulley rotates in a second, and opposite direction of rotation from the first direction, the pulley rotates freely about the shaft, without turning the shaft in the second direction. In a preferred embodiment of the present invention, the pulley rotates in the first direction during the rising of the buoy during an ocean wave crest, which pulls the anchor cable in an upward direction. As the buoy falls during an ocean wave trough, a coil spring winds the second end of the anchor cable back around the pulley preparing it for the next pull.

A flywheel can be mounted inside the case and to the shaft continues to rotate the rotor during the ocean wave troughs. In this manner, the rotor is able to rotate during both ocean wave crests and troughs, and thereby generate a more constant power output. The case in a preferred embodiment is sealed to avoid corrosion and degradation of the components within the chamber, and is filled with an inert gas such as nitrogen.

In view of the foregoing disclosure, some advantages of the present invention can be seen. For example, a novel current power generator is provided. The novel current power generator can generate electricity by responding to water current flow. It can be connected to the power grid to alleviate the ever increasing need for power while generating it cleanly.

While the preferred embodiment of the present invention has been described and illustrated, modifications may be made by one of ordinary skill in the art without departing from the scope and spirit of the invention as defined in the appended claims. For example, in a preferred embodiment of the present invention, the current generators are capable of responding to water current flow in differing directions by weathervaning, however, any method known to one of ordinary skill in the art may be used to align the current generators with the water current flow. Additionally, in a preferred embodiment of the present invention, the generators can be attached to the power grid for consumption. Any means known to one of ordinary skill in the art may be used to synch the generators with the power grid. Any material known to one of ordinary skill in the art may be utilized to form the support frames and the current and wave generators, such as rust resistant metal and the like.

What is claimed is:

1. A water current power generator, comprising:
   a support frame having at least one vertical support member supported on and extending upward from a floor of a body of water, and a pair of submerged parallel horizontal support members mounted to and extending perpendicular to the vertical support member;
   a plurality of generators mounted side-by-side between the horizontal support members, each generator including a rotatable horizontal shaft, operatively connected to the generator such that when the shaft rotates, the generator generates electricity; and
   a plurality of blades mounted to each rotatable shaft, capable of rotation in response to water current, each generator being pivotal relative to the horizontal support members in response to changing directions of current flow.

2. The current power generator of claim 1, further comprising:
   an upper mounting member extending upward from each generator into a pivotal engagement with one of the horizontal support members; and
   a lower mounting member extending downward from each generator into a pivotal engagement with the other of the horizontal support members, the upper and lower mounting members being coaxial and perpendicular to the horizontal support members.

3. The current power generator of claim 1, further comprising electrical contact means for transferring electricity generated by each of the generators to a power cable.

4. The current power generator of claim 1, wherein the at least one vertical support member comprises at least two of the vertical support members.

5. A water current power generator, comprising:
   a buoyant support frame having a vertical support member and a pair of submerged horizontal support members mounted to and extending perpendicular to the vertical support member;
   a plurality of submerged generators, each mounted to the floating support frame between the horizontal support members in a side-by-side relationship, each generator including a rotatable shaft, operatively connected to the generator such that when the shaft rotates, the generator generates electricity;
   a plurality of blades mounted to each rotatable shaft, capable of rotation in response to water current;
   a pair of spaced-apart mooring anchors, each mounted to a seabed; and
   a pair of mooring lines, each having a first and second end, wherein the first end of each of the mooring lines is attached to the support frame at spaced-apart locations and the second end of each of the mooring lines is attached to one of the mooring anchors so as to hold the support frame submerged.

6. The current power generator of claim 5, further comprising mounting means for mounting each of the generators so that each generator is pivotal relative to the horizontal support members in response to changing directions of water current flow.

7. The current power generator of claim 6, further comprising electrical contact means for transferring electricity from each of the generators to a power cable.

8. A water current power generator, comprising:
   a vertical support member, mounted to a bed of a body of water;
   parallel upper and lower horizontal support members mounted to the vertical support member and submerged in the body of water;
   a plurality of generators mounted between the upper and lower horizontal support members, each generator having an upper mounting member extending upward from each generator into engagement with the upper horizontal support member, each generator having a lower mounting member extending downward from each generator into engagement with the lower horizontal support member, each generator including a rotatable shaft operatively connected to the generator such that when the shaft rotates, the generator generates electricity;
   a plurality of blades mounted to each shaft, capable of rotation in response to water current, the upper and lower mounting members allowing each generator to pivot relative to the upper and lower horizontal support members in response to changing directions of current flow; and
   an electrical contact assembly, in electrical communication with each generator for transferring power from each of the generators to an electrical power cable.

9. A water power generator, comprising:
   a support frame, comprising vertical frame members having a first end mounted in a bed of a body of water, and proceeding upward therefrom to a second end, and horizontal support members mounted proximate the second end of the vertical frame members;
   a plurality of submerged water current generators, each having an upper mounting member mounted to one of the horizontal support members and a lower mounting member mounted to another of the horizontal support members to allow each of the generators to independently pivot relative to the support frame in response to changes in current flow direction, each generator including a rotatable shaft, operatively connected to each generator such that when the shaft rotates, the generator generates electricity;

a plurality of blades mounted to each shaft, capable of rotation in response to water current; and a plurality of wave generators mounted to an uppermost one of the horizontal support members for immersion in waves, each of the wave current generators being pivotally mounted to the uppermost one of the horizontal frame members for pivoting relative to the support frame in response to changes in wave direction.

10. The current power generator of claim 9, wherein the wave generators generate electricity independent of the water current generators.

11. A current power generator, comprising:

a support frame, comprising vertical frame members having a first end mounted in a bed of a body of water, and proceeding upward therefrom to a second end, and horizontal frame members mounted generally centrally along the vertical frame members;

a plurality of water current generators mounted in side-by-side relation between and to the horizontal support members, each generator including a rotatable shaft, operatively connected to each generator such that when the shaft rotates, the generator generates electricity, each generator being pivotally mounted to the horizontal support members so that an axis of its rotatable shaft can pivot relative to the horizontal support members in response to changing directions of current flow;

a plurality of blades mounted to each rotatable shaft, capable of rotation in response to water current;

a plurality of wave generators mounted to an uppermost one of the horizontal frame members;

a surface platform mounted at the second end of the vertical support members; and an alternative energy generator mounted upon the surface platform.

12. The current generator of claim 11, further comprising a control house, disposed upon the surface platform.

13. The current generator of claim 12, wherein the control house includes a control room, switch gear, transformers, accommodations, and heliport.

14. The current generator of claim 11, wherein the alternative energy generator is a wind powered generator.

15. The current generator of claim 11, further comprising a support brace, having a first end mounted to the seabed and proceeding angularly upward to a second end mounted to the underside of the surface platform.

* * * * *